United States Patent Office 3,293,258
Patented Dec. 20, 1966

3,293,258
CERTAIN 1-(2-BENZOXAZOLYL)-4-(2-NAPHTH-
OXAZOLYL)-BENZENE COMPOUNDS
Adolf Emil Siegrist, Basel, Erwin Maeder, Aesch, Basel-
Land, Peter Liechti, Binningen, and Leonardo Gugliel-
metti, Basel, Switzerland, assignors to Ciba Limited,
Basel, Switzerland, a company of Switzerland
No Drawing. Filed June 2, 1965, Ser. No. 460,814
Claims priority, application Switzerland, June 19, 1964,
8,059/64
14 Claims. (Cl. 260—307)

It has been found that oxazole compounds which are free from acid groups imparting solubility in water and correspond to the formula (1)
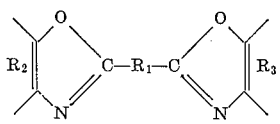

in which $R_1$ represents a monocyclic benzene ring bound in para-position with the oxazole rings, $R_2$ a benzene radical condensed with the oxazole ring in the manner indicated by the valency lines, and $R_3$ represents a naphthalene radical bound with the oxazole ring in the manner indicated by the valency lines—are suitable for use as brightening agents for polyesters.

From among the compounds of the Formula 1 there may be specially mentioned, for example, those of the formula (2)
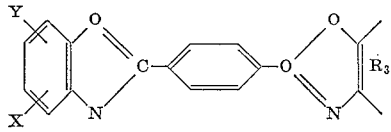

in which $R_3$ represents a naphthalene radical which is free from further substituents and is bound with the oxazole ring in the manner indicated by the valency lines, X a hydrogen atom, a hydrocarbon radical, a chlorine atom or an alkoxy group, and Y represents a hydrogen atom or an alkyl group, and vicinal X and Y together may also form a saturated carbocycle condensed with the benzene ring. As mentioned, the naphthalene radical $R_3$ is preferably free from further substituents and is linked in positions 2,1, or 2,3 or preferably 1,2 with the nitrogen atom and the oxygen atom of one of the oxazole rings. Such oxazole compounds correspond, for example, to the formula (3)
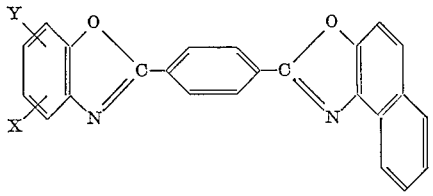

in which X and Y have the above meanings.

Compounds according to Formula 3 of preferred interest are those wherein Y indicates a hydrogen atom and X stands for a hydrocarbon radical, a chlorine atom or an alkoxy group. X and Y together may also form a saturated carbocycle condensed with the benzene ring. Of specific interest are such compounds according to Formula 3 wherein $Y=H$ and X stands for a hydrocarbon radical having from 1 to 12 carbon atoms, an alkoxy group having from 1 to 4 carbon atoms or a halogen atom.

Some compounds of the Formula 1 are known and can quite generally be manufactured by condensing in the molecular ratio of 1:1 an ortho-hydroxyaminoaryl compound and a carboxylic acid of the formulae (4)
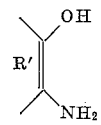

and (5)
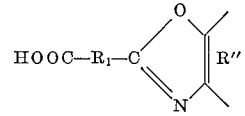

in which $R_1$ represents a benzene radical bound in para-position to the oxazole ring and to the carboxylic acid group, one of the symbols R' and R'' represents a benzene radical bound with oxygen and nitrogen in the manner indicated by the valency lines and the other symbol represents a naphthalene radical bound with oxygen and nitrogen in the manner indicated by the valency lines, with the proviso that the starting materials contain in all at least one more substituent; the carboxylic acid group linked with $R_1$ must, however, be the only acid group imparting solubility in water present in the starting materials.

It is thus possible to react either a benzoxazolylbenzoic acid with an aminohydroxynaphthalene or a naphthoxazolylbenzoic acid with an aminohydroxybenzene. The carboxylic acids of the Formula 5 required as starting materials for this purpose are themselves accessible by condensation of aminohydroxyaryl compounds, whose amino and hydroxyl groups are vicinal relatively to each other, with benzenecarboxylic cid alkyl estercarboxylic acid chlorides followed by hydrolysis of the alkyl ester group; this condensation is advantageously performed in an inert organic solvent at an elevated temperature. The same applies to the condensation of the hydroxyamino compound of the Formula 4 with the carboxylic acid of the Formula 5, which is advantageously performed at a temperature above 220° C.

As examples of starting materials suitable for the manufacture of compounds of the Formula 1 by the route described above there may be mentioned:

(a) Benzenedicarboxylic acids that yield the radical $R_1$: benzene - 1,4-dicarboxylic acid, 2-methylbenzene-1, 4-dicarboxylic acid.

(b) Ortho-aminohydroxybenzenes that yield the radical $R_2$: 1-amino-2-hydroxybenzene, 1-amino-2-hydroxy-5-alkylbenzenes whose alkyl groups may be linear or branched and contain up to 20 carbon atoms, 1-amino-2 - hydroxy - 5 - aralkylbenzenes, 1 - amino-2-hydroxy-5-phenylbenzenes whose phenyl radical may be substituted, 1-amino-2-hydroxy-dialkylbenzenes of which each alkyl radical preferably contains at most 4 carbon atoms, 1-amino - 2 - hydroxychlorobenzenes, 1-amino-2-hydroxymethoxybenzenes, 1 - amino - 2 - hydroxyethoxybenzenes and 1-amino-2-hydroxy-5,6,7,8-tetrahydronaphthalene.

(c) Aminohydroxynaphthalenes that yield the radical $R_3$: 1 - amino-2-hydroxynaphthalene, 2-amino-3-hydroxynaphthalene and 2-amino-1-hydroxynaphthalene.

Of the oxazole compounds of the above Formula 1 manufactured by the process described above those are new which are free from acid groups imparting solubility in water but contain at least one other substituent.

The materials from polyesters, e.g. from polyterephthalic acid ethyleneglycol ester, to be optically brightened by the present process may be in any desired state of processing and in any desired form of distribution. The oxazole compounds of the Formula 1, which are free from acid groups imparting solubility in water, may, for example, be added to or incorporated with the materials before or during the shaping of the latter. Thus, in the manufacture of films, foils, tapes or moulded articles they may be added to the moulding composition or dissolved or finely dispersed in the spinning mass before spinning. The oxazole compounds of the composition defined above may also be added to the reaction mixture before or during the polycondensation or other reactions leading to the polyesters.

If fibres from polyesters, which may be in the form of staple fibres or monofils, in the crude state, in the form of hanks or fabrics, are to be optically brightened by the present process, this is done, for example, in an aqueous medium in which the brightener is suspended. If desirable, the treatment bath may further contain a so-called carrier and/or dispersant, e.g., soaps, polyglycol ethers of fatty alcohols, fatty amines or alkylphenols, cellulose sulfite waste liquor or condensation products of formaldehyde with possibly alkylated naphthalenesulfonic acids. It is particularly advantageous to perform the treatment in a neutral, weakly alkaline or acid bath. It is also of advantage to carry out the treatment at an elevated temperature ranging from about 50 to 100° C., for example at the boiling temperature of the bath or in its vicinity (at about 90° C.). The improvement treatment according to this invention may also be carried out with a solution in an organic solvent.

It is, however, particularly advantageous to impregnate the afore-mentioned fibres with an aqueous dispersion of the optical brightener at temperatures below 75° C., for example at room temperature, and then to subject them to a dry heat treatment at a temperature above 100° C.; in this connection it is in general advantageous first to dry the fibrous materials at a moderately elevated temperature, e.g. at least at 60 to about 100° C. The heat treatment of the dry material is then advantageously carried out at a temperature ranging from 120 to 225° C., for example by heating in a drying chamber, by ironing within the afore-mentioned temperature range or by treatment with dry superheated steam. The drying and the dry heat treatment may be carried out one immediately after the other or they may be combined in a single step. Finally, the oxazole compounds of the composition defined above may be first fixed on a finely dispersed polyester carrier material and used in this form for optically brightening further substrates.

The amount of oxazole compound to be used in the present process, calculated from the weight of the material to be optically brightened, may vary within wide limits. Even a very small amount, in certain cases, e.g. as little as 0.01%, may suffice to produce a distinct and durable effect, though an amount of up to about 0.5% or more may be used as well.

Unless otherwise indicated, parts and percentages in the following manufacturing instructions and examples are by weight.

(A) 8.0 parts of 1-amino-2-hydroxynaphthalene, 12.0 parts of 4-[benzoxazolyl-(2')]-benzoic acid of the Formula 11

(11)
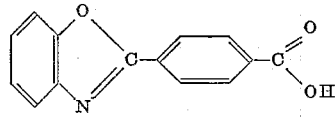

and 0.3 part of boric acid are heated in a mixture of 50 parts by volume of diethyleneglycol diethyl ether and 25 parts by volume of diethyleneglycol dibutyl ether with exclusion of air and while being stirred in the course of 4 hours to 240° C., and the mixture is then heated for another hour at this temperature, during which the lower-boiling solvent and the water of reaction are continuously distilled off. During the cooling the reaction mixture is diluted first with 50 parts by volume of dimethylformamide and then with 50 parts by volume of methanol, completely cooled to about 10° C., suction-filtered, washed with methanol and dried, to yield 15.7 parts (=86.9% of theory) of 1-[benzoxazolyl-(2')]-4-[naphth-(2:1)oxazolyl-(2'')]-benzene of the formula

(12)
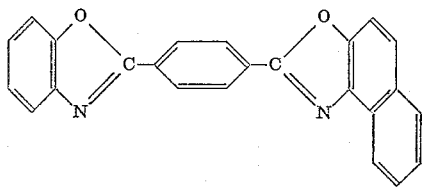

in the form of a yellow powder which melts at 295.5 to 303° C. After three recrystallizations from ortho-dichlorobenzene with the aid of bleaching earth there are obtained about 10.5 parts of small, faintly greenish yellow needles melting at 306 to 306.5° C.

Analysis.—$C_{24}H_{14}O_2N_2$—Mol. weight: 362.37. Calculated: C, 79.55%; H, 3.89%; N, 7.73%. Found: C, 79.28%; H, 3.83%; N, 7.90%.

When 8.0 parts of 2-amino-3-hydroxynaphthalene are used instead of 8.0 parts of 1-amino-2-hydroxynaphthalene, there are obtained about 9.5 parts (=52.5% of theory) of 1-[benzoxazolyl-(2')]-4-[naphth(2:3)oxazolyl-(2'')]-benzene of the formula

(13)
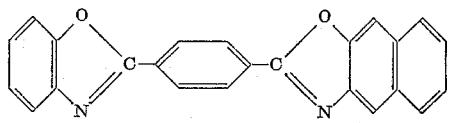

which, after recrystallization from ortho-dichlorobenzene+tetrachloroethylene, is obtained in the form of light-yellow, fine crystals melting at 262 to 263° C.

Analysis.—$C_{24}H_{14}O_2N_2$—Mol. weight: 362.37. Calculated: C, 79.55%; H, 3.89%; N, 7.73%. Found: C, 79.08%; H, 3.93%; N, 7.77%.

(B) 4.1 parts of 4-hydroxy-3-amino-1-methylbenzene, 9.64 parts of 4-[naphth(2:1)oxazolyl-(2')]-benzoic acid of the formula

(14)
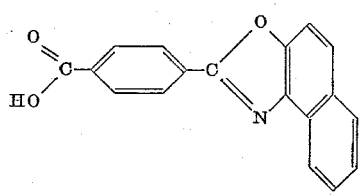

and 0.3 part of boric acid are heated in a mixture of 80 parts by volume of diethyleneglycol diethyl ether and 30 parts by volume of diethyleneglycol dibutyl ether with exclusion of air and with stirring in the course of 4 hours to 240° C., during which the water of reaction and the lower-boiling solvent are continuously distilled off. The batch is then heated for another hour at 240° C., and during the subsequent cooling first 30 parts by volume of dimethylformamide and then 50 parts by volume of methanol are added. The whole is cooled to 10° C., suction-filtered, washed with methanol and dried, to yield about 11.1 parts (=88.5% of theory) of 1-[5'-methyl-benzoxazolyl - (2')] - 4 - [naphth(2:1)oxazolyl - (2'')]-benzene of the formula

(15)
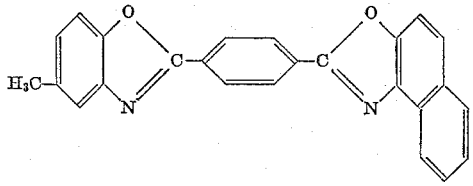

in the form of a yellow crystalline power which melts at 317 to 317.5° C. After three recrystallizations from ortho-dichlorobenzene with the aid of bleaching earth there are obtained about 7.7 parts of small, faintly yellowish needles melting at 321 to 321.5° C.

*Analysis.*—$C_{25}H_{16}O_2N_2$—Mol. weight: 376.39. Calculated: C, 79.77%; H, 4.28%; N, 7.44%. Found: C, 79.71%; H, 4.32%; N, 7.35%.

The 4-[naphth(2:1)oxazolyl-(2')]-benzoic acid of the Formula 14 used as starting material can be prepared thus:

A mixture of 63.6 parts of 1-amino-2-hydroxynaphthalene, 79.5 parts of benzene-1-carboxylic acid methyl ester-4-carboxylic acid chloride and 400 parts by volume of anhydrous ortho-dichlorobenzene is gradually heated with exclusion of air in the course of 3½ hours to about 160° C. 2 parts of boric acid are then added and the temperature is raised to about 200 to 210° C., during which the ortho-dichlorobenzene is distilled off almost completely. During the subsequent cooling, the brown reaction solution is diluted first with 200 parts by volume of dioxane and then with 200 parts by volume of methanol. The batch is cooled to 1° C., suction-filtered, washed with cooled methanol and dried, to yield about 115.8 parts (=95.4% of theory) of 4-[naphth(2:1)-oxazolyl-(2')]-benzoic acid methyl ester in the form of a faintly yellowish powder which melts at 198 to 199° C. To purify the ester it is recrystallized from tetrachloroethylene with the aid of bleaching earth and then sublimed in a high vacuum, to yield a substantially colorless, finely crystalline powder melting at 203° C.

*Analysis.*—$C_{19}H_{13}O_3N$—Mol. weight: 303.30. Calculated: C, 75.24%; H, 4.32%; N, 4.62%. Found: C, 75.47%; H, 4.26%; N, 4.63%.

For hydrolysis 101 parts of the ester are dissolved in 1000 parts by volume of dioxane with 25 parts of sodium hydroxide in 75 parts of water and then stirred for 1½ to 2 hours at 85 to 90° C. During the cooling, 500 parts by volume of methanol are added, and the batch is then cooled to 5° C., suction-filtered, washed with methanol and the filter cake is stirred with 3000 parts of water and 100 parts by volume of hydrochloric acid, once more suction-filtered, washed with water and dried, to yield about 95 parts of 4-[naphth(2:1)oxazolyl-(2')]-benzoic acid of the Formula 14 in the form of a faintly yellowish powder melting at 340 to 340.5° C. After sublimation in a high vacuum the melting point rises to 342 to 342.5° C.

*Analysis.*—$C_{18}H_{11}O_3N$—Mol. weight: 289.28. Calculated: C, 74.73%; H, 3.83%; N, 4.84%. Found: C, 74.99%; H, 4.00%; N, 4.77%.

The compounds listed in the following table can be manufactured in a similar manner; they correspond to the general formula (6) 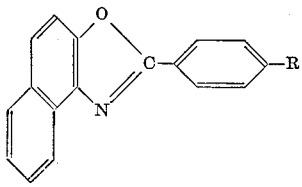

in which R has in each case the meaning shown in Column I of the table.

TABLE

| No. | I Formula R= | II Yield (crude) in percent | III Properties | IV Analysis | |
|---|---|---|---|---|---|
| | | | | Calculated (Mol. wt.) | Found |
| 16 | —C(oxazole-naphth)—⟨benzene⟩—CH$_2$—CH$_3$ | 82.3 | Light-yellow, fine, shiny crystals; M.P. 291° (chlorobenzene). | C, 79.93; H, 4.65; N, 7.17 (390.42). | C, 79.77; H, 4.65; N, 7.35. |
| 17 | —C(oxazole-naphth)—⟨benzene⟩—CH$_2$—CH$_2$—CH$_3$ | 82.4 | Light-yellow, fine crystals; M.P. 280° (o-Dichlorobenzene). | C, 80.18; H, 4.98; N, 6.92 (404.45). | C, 80.13; H, 4.80; N, 6.91. |
| 18 | —C(oxazole-naphth)—⟨benzene⟩—CH(CH$_3$)$_2$ | 83.9 | Pale yellow, fine, shiny crystals; M.P. 274.5 to 275° (Chlorobenzene). | C, 80.18; H, 4.98; N, 6.92 (404.45). | C, 80.10; H, 5.05; N, 7.03. |
| 19 | —C(oxazole-naphth)—⟨benzene⟩—CH$_2$—CH(CH$_3$)$_2$ | 81.8 | Pale yellow, fine, shiny crystals; M.P. 42 to 242.5° (Tetrachloroethylene). | C, 80.36; H, 5.30; N, 6.69. | C, 80.32; H, 5.32; N, 6.94. |
| 20 | —C(oxazole-naphth)—⟨benzene⟩—C(CH$_3$)$_3$ | 84.7 | Pale greenish yellow, shiny needles; M.P. 236 to 236.5° (Tetrachloroethylene). | C, 80.36; H, 5.30; N, 6.69 (418.47). | C, 80.23; H, 5.28; N, 6.70. |
| 21 | —C(oxazole-naphth)—⟨benzene⟩—C(CH$_3$)$_2$—CH$_2$—C(CH$_3$)$_3$ | 86.8 | Pale greenish yellow, fine crystals, M.P. 226.5 to 227° (Tetrachloroethylene). | C, 80.98; H, 6.37; N, 5.90 (574.58). | C, 81.09; H, 6.61; N, 5.98. |
| 22 | —C(oxazole-naphth)—⟨benzene⟩—cyclohexyl | 76.3 | Light yellow, crystals; M.P. 261 to 263° (Tetrachloroethylene). | C, 81.06; H, 5.44; N, 6.30 (444.51). | C, 81.15; H, 5.23; N, 6.38. |

TABLE—Continued

| No. | I<br>Formula R= | II<br>Yield (crude) in percent | III<br>Properties | IV Analysis — Calculated (Mol. wt.) | IV Analysis — Found |
|---|---|---|---|---|---|
| 23 | benzoxazole with –$C_{12}H_{25}$ substituent | 59.9 | Pale yellow, fine crystals; M.P. 118.5 to 119° (Dioxane+methanol). | C, 81.47; H, 7.22; N, 5.28 (530.68). | C, 81.27; H, 7.27; N, 5.06. |
| 24 | benzoxazole with –$CH_2$–phenyl substituent | 78.0 | Light yellow, fine crystals; M.P. 278 to 278.5° (o-Dichlorobenzene). | C, 82.28; H, 4.46; N, 6.19 (452.49). | C, 82.46; H, 4.61; N, 6.30. |
| 25 | benzoxazole with –C(CH$_3$)$_2$–phenyl substituent | 87.4 | Light yellow, fine crystals; M.P. 210 to 210.5° (Tetrachloroethylene). | C, 82.48; H, 5.03; N, 5.83 (480.54). | C, 82.52; H, 5.06; N, 5.81. |
| 26 | benzoxazole with phenyl substituent | 88.3 | Greenish light-yellow fine crystals; M.P. 292 to 292.5° (Chlorobenzene). | C, 82.17; H, 4.14; N, 6.39 (438.46). | C, 82.06; H, 4.18; N, 6.46. |
| 27 | benzoxazole with two –$CH_3$ substituents | 82.3 | Light yellow, fine needles; M.P. 354.5 to 355° (o-Dichlorobenzene). | C, 79.98; H, 4.65; N, 7.17 (390.42). | C, 79.98; H, 4.70; N, 7.42. |
| 28 | benzoxazole with two –$CH_3$ substituents (isomer) | 77.7 | Greenish light-yellow fine crystals; M.P. 263 to 263.5° (Dioxane+ethanol). | C, 79.98; H, 4.65; N, 7.17 (390.42). | C, 79.73; H, 4.61; N, 7.41. |
| 29 | benzoxazole with –$OCH_3$ substituent | 84.6 | Light yellow, shiny crystals; M.P. 299 to 299.5° (Chlorobenzene). | C, 76.52; H, 4.11; N, 7.14 (392.39). | C, 76.30; H, 4.07; N, 7.19. |
| 30 | benzoxazole with –Cl substituent | 80.1 | Light yellow, shiny crystals; M.P. 321 to 321.5° (o-Dichlorobenzene). | C, 72.64; H, 3.30; N, 7.06 (396.83). | C, 72.81; H, 3.03; N, 7.16. |
| 31 | benzoxazole with three –$CH_3$ substituents | 89.3 | Light yellow, fine crystals; M.P. 348 to 349.5° (o-Dichlorobenzene). | C, 80.74; H, 4.84; N, 6.73 (416.46). | C, 80.59; H, 4.74; N, 6.82. |

*Example 1*

A polyester fabric (e.g., "Dacron") is padded at room temperature (about 20° C.) with an aqueous dispersion containing, per litre, 2 g. of one of the compounds of the Formula 12, 15, 20 or 25 and 1 g. of an adduct from about 8 mols of ethylene oxide with 1 mol of para-tertiary octylphenol, and then dried at about 100° C. The dry material is then subjected to a heat treatment at 150 to 220° C. for 2 minutes to a few seconds depending on the temperature used. The treated material has a much better white appearance than the untreated material.

Instead of the Compounds 12, 15, 20 or 25 there may be used the other oxazole compounds of the Formulae 13 and 15 to 31 for brightening polyester fibres by the method described above.

*Example 2*

100 parts of polyester granulate from polyterephthalic acid ethyleneglycol ester are intimately mixed with 0.05 part of one of the oxazole compounds of the Formulae 12, 15, 20 or 25 and melted at 285° C. while being stirred. When the spinning composition is spun through the usual spinnerets, it forms substantially brightened polyester fibres.

What is claimed is:
1. An oxazole compound of the formula

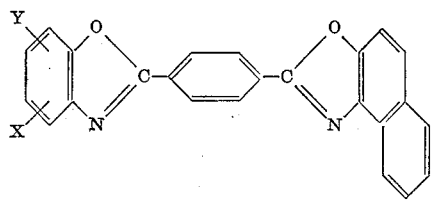

in which X is a member selected from the group consisting of a hydrocarbon radical containing from 1 to 12 carbon atoms, a chlorine atom, and an alkoxy group containing from 1 to 4 carbon atoms, Y stands for a hydrogen atom and X and Y together may form a saturated 6-membered carbocycle condensed with the benzene ring.

2. An oxazole compound of the formula

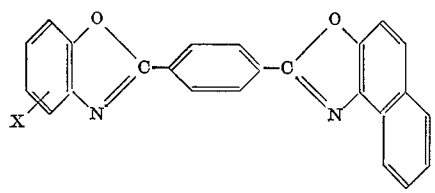

wherein X stands for a hydrocarbon radical having from 1 to 12 carbon atoms.

3. An oxazole compound of the formula

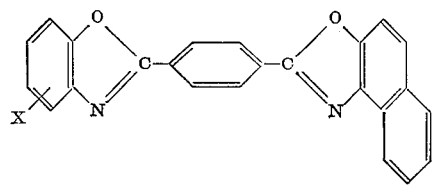

wherein X stands for an alkoxy group having from 1 to 4 carbon atoms.

4. An oxazole compound of the formula

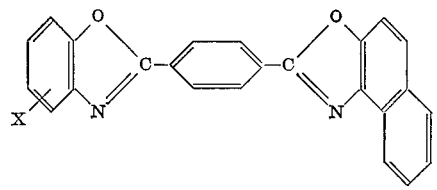

wherein X stands for a phenylalkyl group with 1–3 carbon

5. The compound of the formula

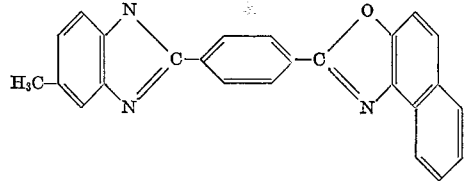

6. An oxazole compound of the formula

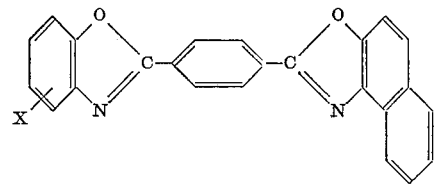

wherein X stands for a phenylalkyl group with 1–3 carbon atoms in the alkyl.

7. The compound of the formula

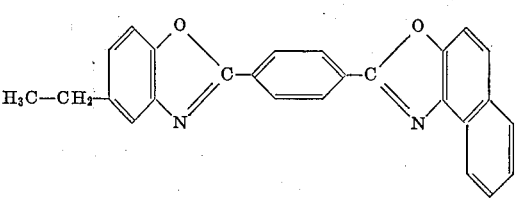

8. The compound of the formula

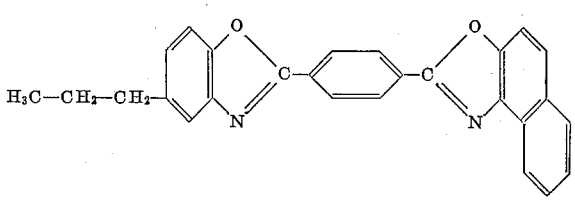

9. The compound of the formula

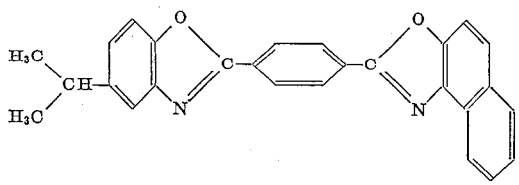

10. The compound of the formula

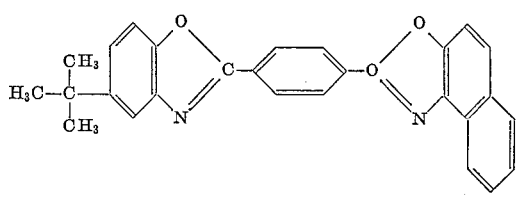

11. An oxazole compound of the formula

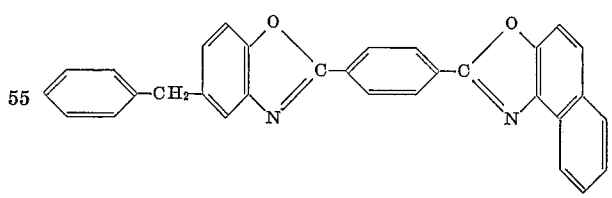

12. An oxazole compound of the formula

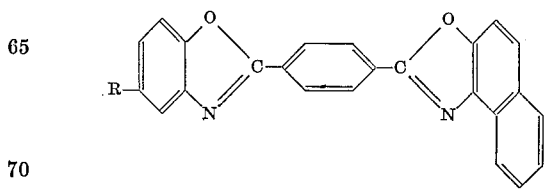

wherein R stands for a member selected from the group consisting of 1,1,3,3-tetra-methyl butyl, cyclo-hexyl, and dodecyl.

13. An oxazole compound of the formula

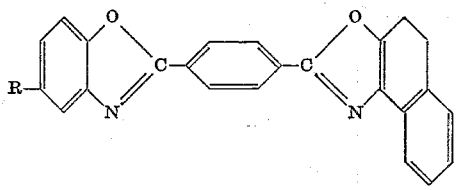

wherein R stands for a member selected from the group consisting of phenyl, benzyl and 2-phenyl isopropyl.

14. A compound of the formula

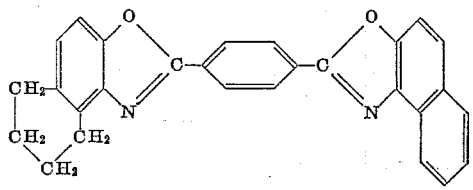

References Cited by the Examiner

UNITED STATES PATENTS

| | | | |
|---|---|---|---|
| 2,737,516 | 3/1956 | Sartori | 260—307.4 |
| 2,985,661 | 5/1961 | Hein et al. | 260—307.4 |
| 3,005,779 | 10/1961 | Ackermann et al. | 252—301.2 |
| 3,135,762 | 6/1964 | Maeder et al. | 260—307 |
| 3,175,980 | 3/1965 | Daglish et al. | 252—301.2 |
| 3,178,445 | 4/1965 | Maeder et al. | 260—307 |

FOREIGN PATENTS 567,665　12/1958　Canada.

ALEX MAZEL, *Primary Examiner.*

A. D. ROLLINS, *Assistant Examiner.*

UNITED STATES PATENT OFFICE
CERTIFICATE OF CORRECTION

Patent No. 3,293,258　　　　　　　　　　　　　December 20, 1966

Adolf Emil Siegrist et al.

It is hereby certified that error appears in the above numbered patent requiring correction and that the said Letters Patent should read as corrected below.

Column 1, formula "(2)" the left-hand portion of the formula should appear as shown below instead of as in the patent:

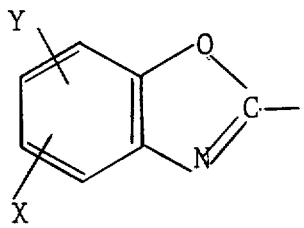

column 2, line 34, for "cid" read -- acid --; columns 5 and 6, in the TABLE, opposite No. 21, fourth column, line 2 thereof, for "(574.58)" read -- (474.58) --; column 9, line 53, for "phenylalkyl group with 1-3 carbon" read -- halogen atom --; column 9, claim 5, the left-hand portion of the formula should appear as shown below instead of as in the patent:

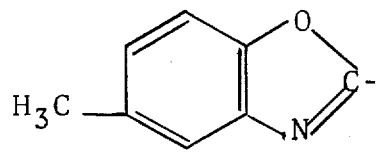

Signed and sealed this 28th day of November 1967.

(SEAL)
Attest:

EDWARD M. FLETCHER, JR.　　　　　　　　EDWARD J. BRENNER
Attesting Officer　　　　　　　　　　　Commissioner of Patents